United States Patent
Hong (10) Patent No.: US 12,052,627 B2
(45) Date of Patent: Jul. 30, 2024

(54) NETWORK CONFIGURATION METHOD AND APPARATUS, AND NETWORK MEASUREMENT METHOD AND APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/875,638

(22) Filed: May 15, 2020

(65) Prior Publication Data

US 2020/0280900 A1  Sep. 3, 2020

Related U.S. Application Data

(63) Continuation of application No. PCT/CN2017/113487, filed on Nov. 29, 2017.

(51) Int. Cl.
| | |
|---|---|
| *H04W 36/32* | (2009.01) |
| *H04W 36/00* | (2009.01) |
| *H04W 74/0833* | (2024.01) |
| *H04W 76/27* | (2018.01) |
| *H04W 92/20* | (2009.01) |

(52) U.S. Cl.
CPC ....... *H04W 36/32* (2013.01); *H04W 36/0058* (2018.08); *H04W 74/0833* (2013.01); *H04W 76/27* (2018.02); *H04W 92/20* (2013.01)

(58) Field of Classification Search
CPC . H04W 36/32; H04W 76/27; H04W 36/0058; H04W 74/0833; H04W 92/20

USPC ......................................................... 455/441
See application file for complete search history.

(56) References Cited

U.S. PATENT DOCUMENTS

| | | | | |
|---|---|---|---|---|
| 8,457,038 | B1 * | 6/2013 | Xue ............... | H04W 36/00837 370/332 |
| 2005/0020203 | A1 * | 1/2005 | Losh ............... | H04W 36/00837 455/11.1 |
| 2010/0309887 | A1 | 12/2010 | Kim et al. | |

(Continued)

FOREIGN PATENT DOCUMENTS

| | | |
|---|---|---|
| CN | 101583169 A | 11/2009 |
| CN | 101803236 A | 8/2010 |

(Continued)

OTHER PUBLICATIONS

International Search Report in the International Application No. PCT/CN2017/113487, mailed on Aug. 20, 2018.

(Continued)

*Primary Examiner* — Chuck Huynh
(74) *Attorney, Agent, or Firm* — Finnegan, Henderson, Farabow, Garrett & Dunner, L.L.P.

(57) ABSTRACT

A network configuration method includes: receiving a random access request sent by user equipment; and sending a radio resource control connection reconfiguration signaling to the user equipment, wherein the radio resource control connection reconfiguration signaling carries a first speed threshold configured to instruct the user equipment to perform cell measurement on adjacent cells of a public Long Term Evolution (LTE) network when the UE moves at a speed less than the first speed threshold.

12 Claims, 8 Drawing Sheets

(56) References Cited

U.S. PATENT DOCUMENTS

| | | | |
|---|---|---|---|
| 2011/0250891 A1* | 10/2011 | Zou | H04W 36/04 |
| | | | 455/437 |
| 2011/0263262 A1 | 10/2011 | Min et al. | |
| 2013/0178213 A1 | 7/2013 | Li | |
| 2013/0295931 A1 | 11/2013 | Yu et al. | |
| 2014/0099959 A1 | 4/2014 | Min et al. | |
| 2014/0141785 A1 | 5/2014 | Wang et al. | |
| 2015/0271789 A1 | 9/2015 | Gao et al. | |
| 2016/0142962 A1 | 5/2016 | Min et al. | |
| 2016/0255564 A1 | 9/2016 | Yang et al. | |
| 2020/0022073 A1* | 1/2020 | Yang | H04L 5/0051 |
| 2020/0245216 A1 | 7/2020 | Min et al. | |

FOREIGN PATENT DOCUMENTS

| | | |
|---|---|---|
| CN | 102647766 A | 8/2012 |
| CN | 102905324 A | 1/2013 |
| CN | 102938917 A | 2/2013 |
| CN | 103581866 A | 2/2014 |
| CN | 103581886 A | 2/2014 |
| CN | 104170467 A | 11/2014 |
| CN | 105228200 A | 1/2016 |
| CN | 105519153 A | 4/2016 |
| CN | 106454715 A | 2/2017 |
| CN | 106937336 A | 7/2017 |
| WO | WO 2016/090609 A1 | 6/2016 |
| WO | WO 2016119914 A1 | 8/2016 |

OTHER PUBLICATIONS

English translation of the Written Opinion of the International Search Authority in the international application No. PCT/CN2017/113487, mailed on Aug. 20, 2018.

Intel Corporation et al: "Cell reselection for the UE on high-speed-dedicated network", 3GPP TSG RAN WG2 Meeting #100, R2-1712616, Reno, Nov. 30-Dec. 3, 2017, 4 pages.

Supplementary European Search Report in European Application No. 17933286.1, mailed on Oct. 27, 2020.

Examination Report dated Jun. 22, 2021, issued in counterpart Indian Application No. 202047026086.

Second Office Action dated Jul. 12, 2021, from The State Intellectual Property Office of People's Republic of China in counterpart Chinese Application No. 201780003597.7.

Catt, "Discussion on UE speed criterion for MDT", 3GPP TSG RAN WG2 Meeting #78 R2-122147, Prague, Czech Republic, May 21-25, 2012, 2 pages.

Intel Corporation, "Discussion on high speed train scenarios", 3GPP TSG-RAN WG4 Meeting #74bis R4-152151, Rio de Janeiro, Brazil, Apr. 20-24, 2015, 11 pages.

Notice of Allowance of Chinese Application No. 202210280354.0, issued on Jan. 9, 2024, 7 pages.

* cited by examiner

NETWORK CONFIGURATION METHOD AND APPARATUS, AND NETWORK MEASUREMENT METHOD AND APPARATUS

CROSS-REFERENCE TO RELATED APPLICATION

The present application is a continuation application of International Application No. PCT/CN2017/113487 filed on Nov. 29, 2017, the disclosure of which is incorporated by reference herein in its entity.

TECHNICAL FIELD

The disclosure relates to the field of communication technology, and particularly to a network configuration method and apparatus, and a network measurement method and apparatus.

BACKGROUND

In related technologies, with a rapid development of the high-speed railway technology and a rapid deployment of the high-speed railway, an increasing number of users choose to travel by high-speed railway. It is a development goal of a high-speed-railway dedicated network to ensure normal communication for the users who travel by high-speed railway. The high-speed-railway dedicated network introduces a handover between the high-speed-railway dedicated network and a Long Term Evolution (LTE) network. As a result, how to increase a success rate of the handover becomes a problem to be solved in the art.

SUMMARY

According to a first aspect of embodiments of the disclosure, a network configuration method is provided and applied to a base station in a high-speed-railway dedicated network. The method includes: receiving a random access request from user equipment (UE); and sending a radio resource control connection reconfiguration signaling to the UE, wherein the radio resource control connection reconfiguration signaling carries a first speed threshold configured to instruct the UE to perform cell measurement on adjacent cells in a public LTE network when the UE moves at a speed less than the first speed threshold.

According to a second aspect of embodiments of the disclosure, a network measurement method is provided and applied to UE that is connected to a cell in a high-speed dedicated network. The method includes: monitoring a moving speed of the UE; and performing cell measurement on adjacent cells in a public LTE network when the monitored moving speed is less than a first speed threshold.

According to a third aspect of embodiments of the disclosure, a base station includes: a processor; and a memory configured to store instructions executable by the processor; wherein the processor is configured to: receive a random access request from UE; and send a radio resource control connection reconfiguration signaling to the UE, wherein the radio resource control connection reconfiguration signaling carries a first speed threshold configured to instruct the UE to perform cell measurement on adjacent cells in a public LTE network when the UE moves at a speed less than the first speed threshold.

According to a fourth aspect of the embodiments of the disclosure, UE includes: a processor; and a memory configured to store instructions executable by the processor; wherein the processer is configured to: monitor a moving speed of the UE; and perform cell measurement on adjacent cells in a public LTE network when the monitored moving speed is less than a first speed threshold.

The technical solutions provided in the embodiments of the disclosure may have the following beneficial effects. In the embodiments, the base station in the high-speed-railway dedicated network may configure the first speed threshold for the UE, to make the UE perform cell measurement on the adjacent cells in the public LTE network when the UE moves at a speed less than the first speed threshold, which facilitate a handover to a cell in the public LTE network. The handover to the cell in the public LTE network during a low-speed movement is achieved and the handover to the cell in the public LTE network during a high-speed movement is reduced, thereby increasing a success rate of the handover from the cell in the high-speed-railway dedicated network to the cell in the public LTE network.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

In related technologies, a high-speed-railway dedicated network is designed to ensure a smooth communication during high-speed moving. Both the high-speed-railway dedicated network and a public LTE network may cover a same area simultaneously, which involves cell handover between the high-speed-railway dedicated network and the public LTE network performed by user equipment (UE). But the handover of the UE from the high-speed-railway dedicated network to the public LTE network may have a low success rate when the UE is travelling at a high speed such as a speed of 200-300 km/h. If the handover fails, the communication of the UE may be interrupted, which prevents the user from communicating normally.

In embodiments of the disclosure, a base station configures a speed threshold for the UE. When a moving speed of the UE drops below the speed threshold, the UE performs cell measurement on adjacent cells in the public LTE network. When the measurement result meets a requirement for the handover, the UE may perform the handover from a cell in the high-speed-railway dedicated network to a cell in the public LTE network. In this case, the moving speed of the UE is lower and the success rate of the handover between the cells is higher, ensuring the smooth communication of the UE.

If the moving speed of the UE does not drop below the speed threshold, the UE does not perform the cell measurement on the adjacent cells in the public LTE network, which avoids the UE being handed over to the cell in the public LTE network. In this case, the UE mostly performs the handover between cells in the high-speed-railway dedicated network with a greater success rate.

Figure 1:
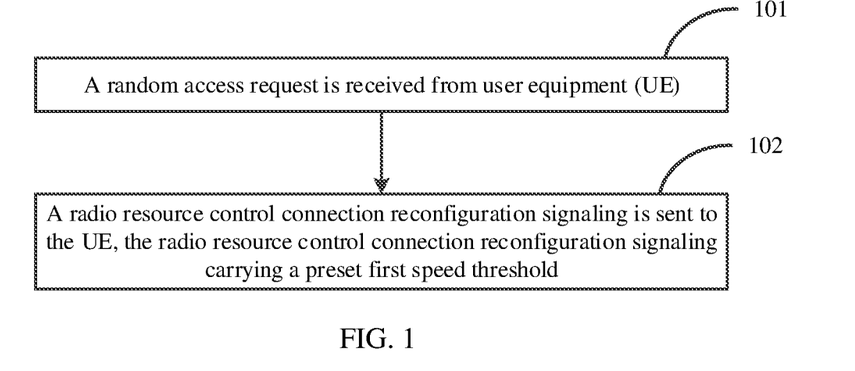
FIG. 1 is a flowchart illustrating a network configuration method according to an exemplary embodiment of the disclosure.

FIG. 1 is a flowchart illustrating a network configuration method according to an exemplary embodiment of the disclosure. For example, the network configuration method is applied to a base station in a high-speed-railway dedicated network. As illustrated in FIG. 1, the method includes the following operations.

In operation 101, a random access request is received from UE.

In operation 102, a radio resource control connection reconfiguration signaling is sent to the UE, the radio resource control connection reconfiguration signaling carrying a preset first speed threshold. The first speed threshold is configured to instruct the UE to perform cell measurement on adjacent cells in a public LTE network when the UE moves at a speed less than the first speed threshold.

In the embodiment, a new message format of the radio resource control connection reconfiguration signaling is provided to add new information, i.e., the first speed threshold, into the radio resource control connection reconfiguration signaling. The first speed threshold is to instruct the UE to perform cell measurement on the adjacent cells in the public LTE network when the UE moves at a speed less than the first speed threshold. This makes the UE to be handed over to a cell in the public LTE network when the UE moves at a low speed, which increases a success rate of the handover. During a high-speed movement, the handover to a cell in the public LTE network is not performed as much as possible, while the handover to a cell in the high-speed-railway dedicated network is more often performed, which improves the success rate of the handover.

In an embodiment, the radio resource control connection reconfiguration signaling further carries a preset second speed threshold. The second speed threshold is configured to instruct the UE to perform no cell measurement on the adjacent cells in the public LTE network when the UE moves at a speed greater than the second speed threshold, the second speed threshold being not less than the first speed threshold.

In the embodiment, a new message format of the radio resource control connection reconfiguration signaling is provided to add new information, i.e., the second speed threshold, into the radio resource control connection reconfiguration signaling. The second speed threshold is to instruct the UE to perform no cell measurement on the adjacent cells in the public LTE network when the UE moves at a speed greater than the second speed threshold.

For example, the first speed threshold is about 60 km/h, and the second speed threshold is about 80 km/h. When the second speed threshold is greater than the first speed threshold, the UE may be prevented from frequently alternating between performing cell measurement on the adjacent cells in the public LTE network and performing no cell measurement on the adjacent cells in the public LTE network, so that power consumption of the UE may be reduced. When the moving speed of the UE changes from high to low, the first speed threshold is taken as a reference, and when the moving speed changes from low to high, the second speed threshold is taken as a reference. When the moving speed of the UE does not decrease to the first speed threshold, the second speed threshold is not taken as a reference for the moving speed, and cell measurement on the adjacent cells in the public LTE network is not required to be performed. After the moving speed of the UE decreases below the first speed threshold, the moving speed begins to rise, and cell measurement may be performed on the adjacent cells in the public LTE network before the moving speed rises to the second speed threshold.

In an embodiment, the radio resource control connection reconfiguration signaling further carries relevant information of an adjacent first cell in the public LTE network, which is used for instructing the UE to perform cell measurement on the first cell according to the relevant information when the UE moves at a speed less than the first speed threshold.

In the embodiment, a new message format of the radio resource control connection reconfiguration signaling is provided to add the relevant information of the adjacent first cell in the public LTE network into the radio resource control connection reconfiguration signaling. The relevant information of the first cell is to instruct the UE to perform cell measurement on the first cell according to the relevant information when the UE moves at a speed less than the first speed threshold. The first cell may include one or more cells. In the embodiment, one or more adjacent cells in the public LTE network, on which the UE is instructed to perform cell measurement, are referred to as the first cell.

The first cell may be a part of the adjacent cells in the public LTE network. In other words, the UE does not have to perform cell measurement on all the adjacent cells in the public LTE network, in order to reduce the power consumption of the UE. The first cell instructed by the radio resource control connection reconfiguration signaling may be adjacent cells on which handover is performed with a higher success rate. As a result, the success rate of the handover is increased.

The relevant information of the first cell includes information such as a cell identifier.

In an embodiment, the relevant information of the first cell is obtained in advance through one of the following manners.

In a first manner, relevant information of an adjacent first cell in the public LTE network is configured into a base station in the high-speed-railway dedicated network, when the base station in the high-speed-railway dedicated network or a base station in the public LTE network is established initially.

In the embodiment, the relevant information of the adjacent first cell in the public LTE network may be configured into the base station in the high-speed-railway dedicated network when the base station in the high-speed-railway dedicated network is established initially. A command may be sent through a control device to configure the relevant information of the adjacent first cell in the public LTE network, to the base station in the high-speed-railway dedicated network. Alternatively, when the base station in the public LTE network is established initially, the relevant information of the first cell, which is covered by the base station in the public LTE network, may be manually added into the base station in the high-speed-railway dedicated network.

In a second manner, relevant information of an adjacent first cell in the public LTE network is obtained via an X2 communication message when an X2 interface connection to an adjacent base station in the public LTE network is established initially.

In the embodiment, after the base station in the high-speed-railway dedicated network is established, the base station in the high-speed-railway dedicated network is initialized, which involves initial establishment of the X2 interface connection. The base station in the high-speed-railway dedicated network sends an X2 SET REQUEST (an X2 establishment request) to the adjacent base station in the public LTE network via an X2 interface (a communication interface between the base stations). The adjacent base station in the public LTE network feeds an X2 SET RESPONSE (an X2 establishment response), which carries the relevant information of the first cell covered by the local base station, back to the base station in the high-speed-railway dedicated network. Alternatively, after the base station in the public LTE network is established, the base station in the public LTE network is initialized, which involves the initial establishment of the X2 interface connection. The base station in the public LTE network sends the X2 SET REQUEST, which carries the relevant information of the first cell covered by the local base station, to the adjacent base station in the high-speed-railway dedicated network via the X2 interface.

In a third manner, relevant information of an adjacent first cell in the public LTE network is obtained by communicating with an adjacent base station in the public LTE network via an X2 communication message when a random access request is received from the UE for the first time.

In the embodiment, after the base station in the high-speed-railway dedicated network is established, when the base station receives the random access request from the UE for the first time, i.e., when configuration information of the relevant information of the adjacent first cell in the public LTE network is not found during search for local configuration information, the base station obtains the relevant information of the adjacent first cell in the public LTE network by sending the X2 communication message to the adjacent base station in the public LTE network via the X2 interface.

The above three manners may also be adopted in combination, for example, the relevant information of the first cell may be obtained at different times.

The UE can perform cell measurement on the adjacent cells periodically or according to an instruction of the base station in the high-speed-railway dedicated network. A measurement report is sent to the base station in the high-speed-railway dedicated network. The base station in the high-speed-railway dedicated network determines whether the UE needs to be handed over to the adjacent cell according to the received measurement report and initiates a handover process if it is determined that the handover is needed.

After receiving a handover request, the adjacent base station in the public LTE network judges whether the handover request is from the high-speed-railway dedicated network. If the handover request is from the high-speed-railway dedicated network, the adjacent base station in the public LTE network processes the handover for the UE in the high-speed-railway dedicated network first. For example, the adjacent base station in the public LTE network receives handover requests from at least two UEs in a very short period of time (such as about 100 milliseconds). If one of the at least two UEs is in the high-speed-railway dedicated network and another one is in the public LTE network, the handover request of the UE in the high-speed-railway dedicated network is processed firstly.

The network configuration method on the base station side is described above. A network measurement method on the UE side, which corresponds to the above network configuration method, is described below.

Figure 2:
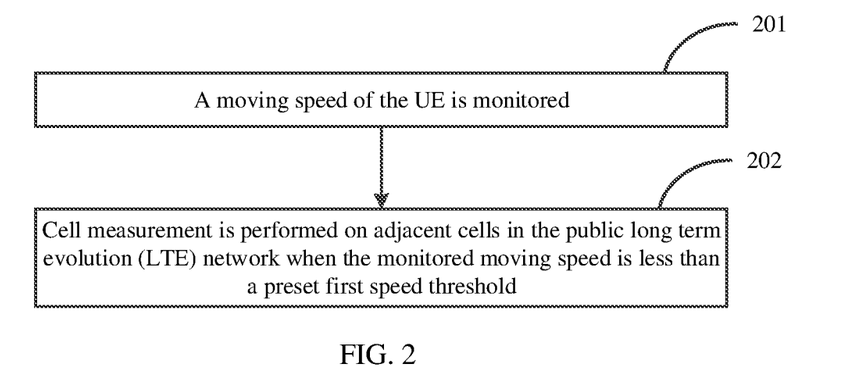
FIG. 2 is a flowchart illustrating a network measurement method according to an exemplary embodiment of the disclosure.

FIG. 2 is a flowchart illustrating a network measurement method according to an exemplary embodiment of the disclosure. The network measurement method is applied to a UE such as a cellphone or the like. As illustrated in FIG. 2, the method includes the following operations.

The UE is connected to a cell in the high-speed dedicated network.

In operation 201, a moving speed of the UE is monitored.

In operation 202, cell measurement is performed on adjacent cells in the public LTE network when the monitored moving speed is less than a preset first speed threshold.

In the embodiment, the UE may monitor its moving speed in real time or periodically. The manner in which the UE monitors its moving speed may be configured by a base station to which the UE belongs. When the UE moves at a speed less than the first speed threshold, cell measurement is performed on the adjacent cells in the public LTE network. When the UE moves at a speed not less than the first speed threshold, no cell measurement is performed on the adjacent cells in the public LTE network. In this case, power consumption of the UE during cell measurement is reduced. Further, the UE performs cell measurement on the adjacent cells in the public LTE network when the UE moves at a relatively low speed, and thus performs the cell handover at the relatively low speed, improving the success rate of the cell handover.

In an embodiment, no cell measurement is performed on the adjacent cells in the public LTE network when the monitored moving speed is greater than a preset second speed threshold. The second speed threshold is not less than the first speed threshold.

For example, the first speed threshold is about 60 km/h. The second speed threshold is about 80 km/h. When the second speed threshold is greater than the first speed threshold, the UE may be prevented from frequently alternating between performing cell measurement on the adjacent cells in the public LTE network and performing no cell measurement on the adjacent cells in the public LTE network, so that power consumption of the UE may be reduced. When the moving speed of the UE changes from high to low, the first speed threshold is taken as a reference, and when the moving speed changes from low to high, the second speed threshold is taken as a reference. When the moving speed of the UE does not decrease to the first speed threshold, the second speed threshold is not taken as a reference for the moving speed, and cell measurement on the adjacent cells in the public LTE network is not required to be performed. After the moving speed of the UE decreases below the first speed threshold, the moving speed begins to rise, and cell measurement may be performed on the adjacent cells in the public LTE network before the moving speed rises to the second speed threshold.

In an embodiment, the operation 202 includes performing cell measurement on an adjacent first cell in the public LTE network according to preconfigured relevant information of the first cell.

In the embodiment, the UE may only perform cell measurement on a part of the adjacent cells in the public LTE network rather than all the adjacent cells in the public LTE network according to configuration, which may reduce power consumption of the UE during the cell measurement. The configured adjacent first cell in the public LTE network may be an adjacent cell where the handover is performed with a higher success rate, such that the success rate of the handover can be increased.

In an embodiment, at least one of the first speed threshold, the second speed threshold or the relevant information of the adjacent first cell in the public LTE network is obtained through the following manner: sending a random access request to a base station in the high-speed dedicated network; and receiving a radio resource control connection reconfiguration signaling fed back by the base station in the high-speed dedicated network, the radio resource control connection reconfiguration signaling carrying at least one of the preset first speed threshold, the second speed threshold or the relevant information of the adjacent first cell in the public LTE network.

In the embodiment, a new format of the radio resource control connection reconfiguration signaling is provided to add the first speed threshold, the second speed threshold and the relevant information of the first cell into the radio resource control connection reconfiguration signaling. The UE may obtain the above information by parsing the radio resource control connection reconfiguration signaling in the new format.

The UE may further send a measurement report to the base station in the high-speed dedicated network. The base station in the high-speed dedicated network determines whether there is a need to perform the cell handover according to the received measurement report and initiates the handover process if the cell handover is needed.

Figure 3:
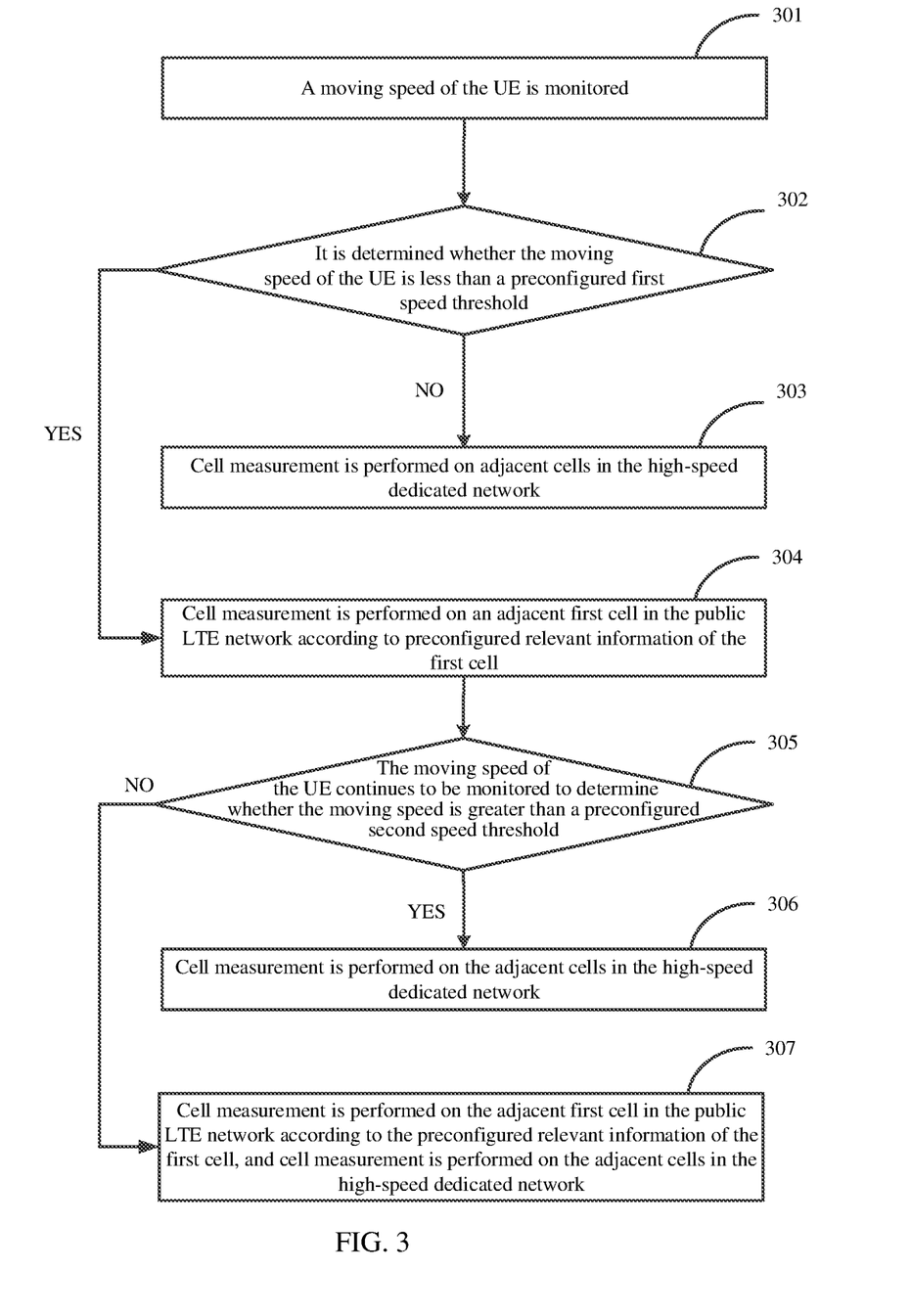
FIG. 3 is a flowchart illustrating a network measurement method according to an exemplary embodiment of the disclosure.

FIG. 3 is a flowchart illustrating a network measurement method according to an exemplary embodiment of the disclosure. The network measurement method is applied to UE such as a cellphone or the like. As illustrated in FIG. 3, the method includes the following operations.

The UE is connected to a cell in the high-speed dedicated network.

In operation 301, a moving speed of the UE is monitored.

In operation 302, it is determined whether the moving speed of the UE is less than a preconfigured first speed threshold; if the monitored moving speed is less than the preconfigured first speed threshold, operation 304 is performed, and if the monitored moving speed is not less than the preconfigured first speed threshold, operation 303 is performed.

In operation 303, cell measurement is performed on adjacent cells in the high-speed dedicated network.

In operation 304, cell measurement is performed on an adjacent first cell in the public LTE network according to preconfigured relevant information of the first cell, and cell measurement is performed on the adjacent cells in the high-speed dedicated network.

In operation 305, the moving speed of the UE continues to be monitored to determine whether the moving speed is greater than a preconfigured second speed threshold. If the monitored moving speed is greater than the preconfigured second speed threshold, operation 306 is performed; and if the monitored moving speed is not greater than the preconfigured second speed threshold, operation 307 is performed.

In operation 306, cell measurement is performed on the adjacent cells in the high-speed dedicated network.

In operation 307, cell measurement is performed on the adjacent first cell in the public LTE network according to the preconfigured relevant information of the first cell, and cell measurement is performed on the adjacent cells in the high-speed dedicated network.

Figure 4:
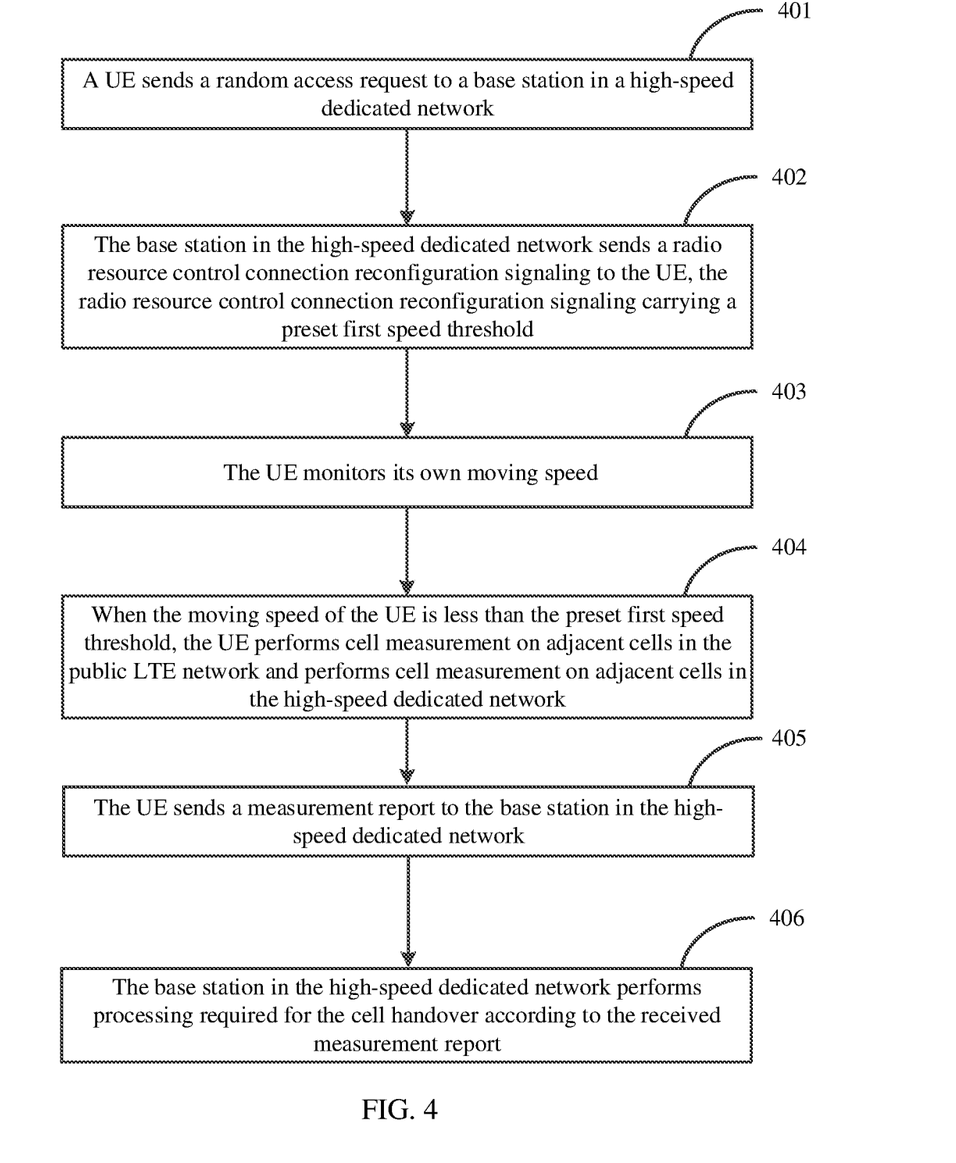
FIG. 4 is a flowchart illustrating a method for random access and cell measurement according to an exemplary embodiment of the disclosure.

FIG. 4 is a flowchart illustrating a method for random access and cell measurement according to an exemplary embodiment of the disclosure. The method for random access and cell measurement is applied to a base station and UE. As illustrated in FIG. 4, the method includes the following operations.

In operation 401, the UE sends a random access request to a base station in the high-speed dedicated network.

In operation 402, the base station in the high-speed dedicated network sends a radio resource control connection reconfiguration signaling to the UE, the radio resource control connection reconfiguration signaling carrying a preset first speed threshold.

In operation 403, the UE monitors its own moving speed.

In operation 404, when the monitored moving speed of the UE is less than the preset first speed threshold, the UE performs cell measurement on adjacent cells in the public LTE network. In addition, the UE may also perform cell measurement on adjacent cells in the high-speed dedicated network.

In operation 405, the UE sends a measurement report to the base station in the high-speed dedicated network.

In operation 406, the base station in the high-speed-railway dedicated network performs processing required for the cell handover according to the received measurement report.

The above embodiments can be combined freely according to an actual requirement.

Figure 5:
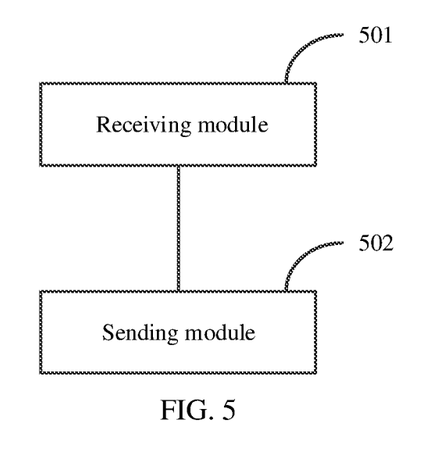
FIG. 5 is a block diagram illustrating a network configuration device according to an exemplary embodiment of the disclosure.

FIG. 5 is a block diagram illustrating a network configuration device according to an exemplary embodiment of the disclosure. The device can be implemented as a part or all of an electrical device via software, hardware or a combination of software and hardware. Referring to FIG. 5, the network configuration device includes a receiving module 501 and a sending module 502.

The receiving module 501 is configured to receive a random access request from UE.

The sending module 502 is configured to send a radio resource control connection reconfiguration signaling to the UE. The radio resource control connection reconfiguration signaling carries a preset first speed threshold configured to instruct the UE to perform cell measurement on adjacent cells in the public LTE network when the UE moves at a speed less than the first speed threshold.

In an embodiment, the radio resource control connection reconfiguration signaling further carries a preset second speed threshold configured to instruct the UE to perform no cell measurement on the adjacent cells in the public LTE network when the UE moves at a speed greater than the second speed threshold. The second speed threshold is not less than the first speed threshold.

In an embodiment, the radio resource control connection reconfiguration signaling further carries relevant information of an adjacent first cell in the public LTE network. The relevant information is configured to instruct the UE to perform cell measurement on the first cell according to the relevant information when the UE moves at a speed less than the first speed threshold.

Figure 6:
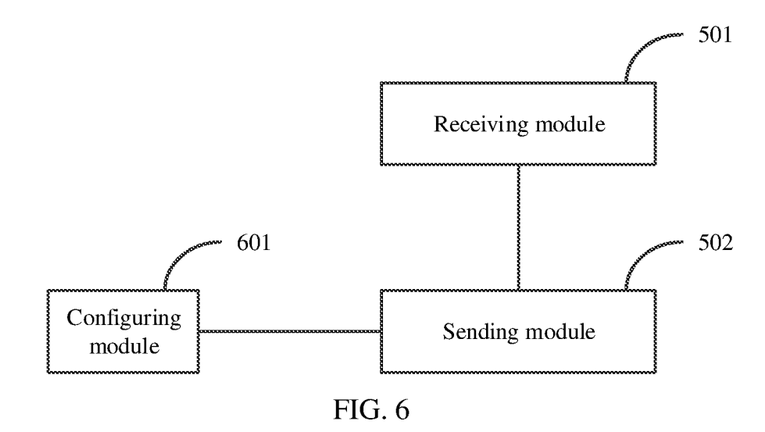
FIG. 6 is a block diagram illustrating a network configuration device according to an exemplary embodiment of the disclosure.
Figure 7:
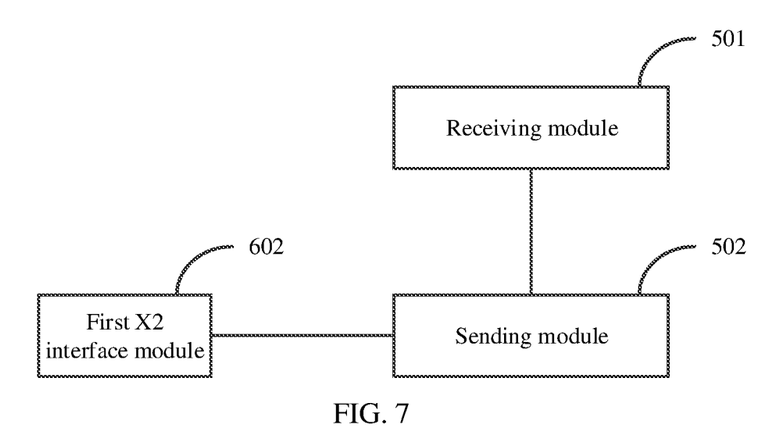
FIG. 7 is a block diagram illustrating a network configuration device according to an exemplary embodiment of the disclosure.
Figure 8:
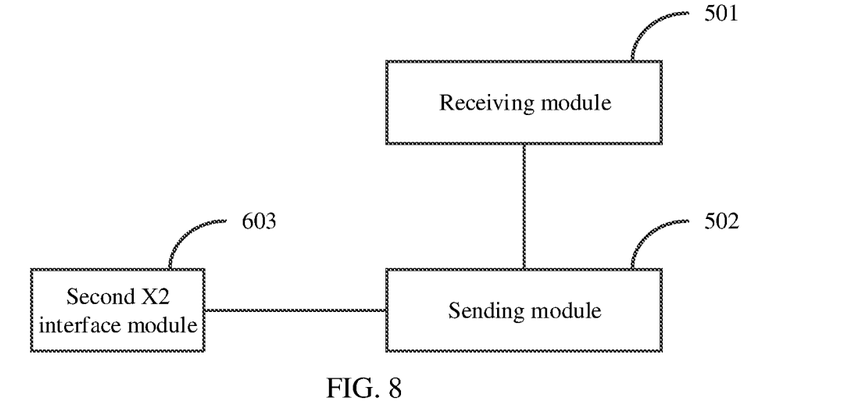
FIG. 8 is a block diagram illustrating a network configuration device according to an exemplary embodiment of the disclosure.

In some embodiments, illustrated in FIG. 6 to FIG. 8, the device further includes a configuring module 601, a first X2 interface module 602 or a second X2 interface module 603.

The configuring module 601 is to configure the relevant information of the adjacent first cell in the public LTE network into a base station in the high-speed-railway dedicated network, when the base station in the high-speed-railway dedicated network or a base station in the public LTE network is established initially.

The first X2 interface module 602 is configured to obtain the relevant information of the adjacent first cell in the public LTE network via an X2 communication message when an X2 interface connection to an adjacent base station in the public LTE network is established initially.

The second X2 interface module 603 is configured to obtain the relevant information of the adjacent first cell in the public LTE network by communicating with the adjacent base station in the public LTE network via the X2 communication message when the random access request is received from the UE for the first time.

Figure 9:
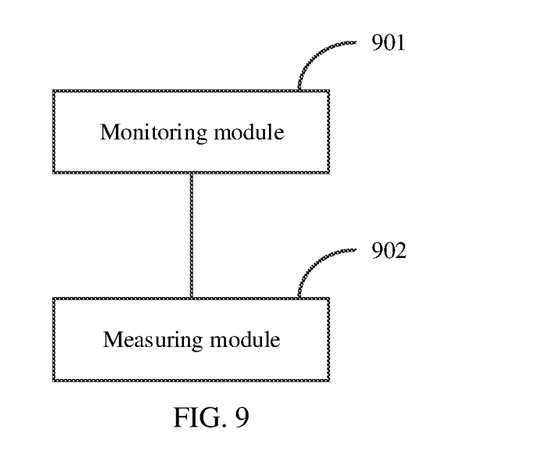
FIG. 9 is a block diagram illustrating a network measurement device according to an exemplary embodiment of the disclosure.

FIG. 9 is a block diagram illustrating a network measurement device according to an exemplary embodiment of the disclosure. The device can be implemented as a part or all of an electrical device via software, hardware or a combination of software and hardware. Referring to FIG. 9, the network measurement device includes a monitoring module 901 and a measuring module 902.

The monitoring module 901 is configured to monitor a moving speed of the network measurement device.

The measuring module 902 is configured to perform cell measurement on adjacent cells in the public LTE network when the monitored moving speed is less than a preset first speed threshold.

Figure 10:
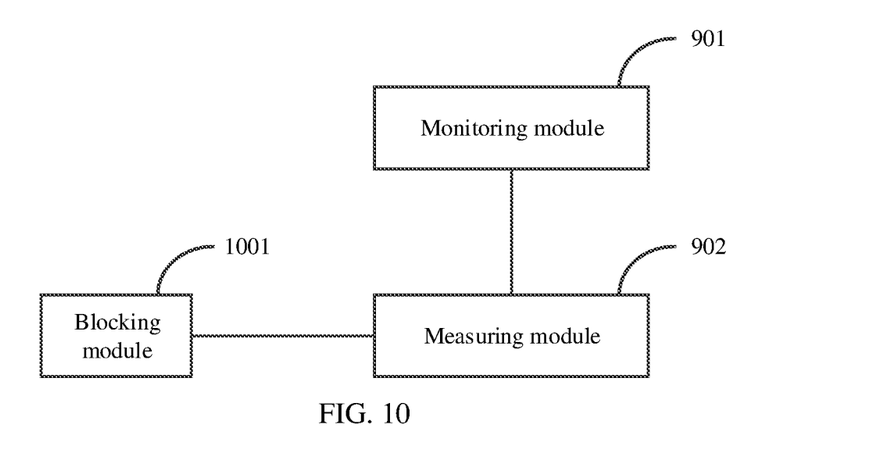
FIG. 10 is a block diagram illustrating a network measurement device according to an exemplary embodiment of the disclosure.

In an embodiment, illustrated in FIG. 10, the device further includes a blocking module 1001.

The blocking module 1001 is configured to perform no cell measurement on the adjacent cells in the public LTE network when the monitored moving speed is greater than a preset second speed threshold. The second speed threshold is not less than the first speed threshold.

Figure 11:
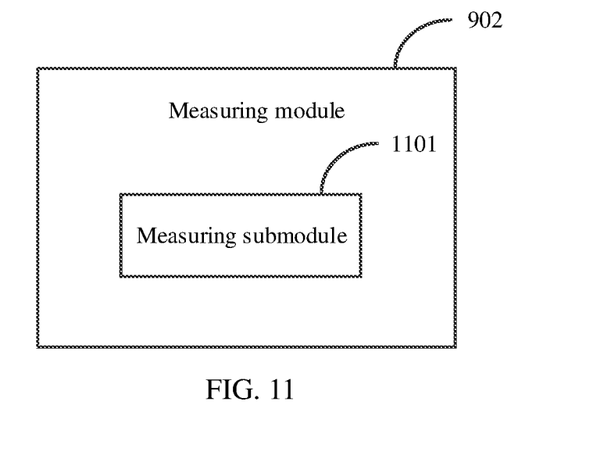
FIG. 11 is a block diagram illustrating a network measurement device according to an exemplary embodiment of the disclosure.

In an embodiment, illustrated in FIG. 11, the measuring module 902 includes a measuring submodule 1101.

The measuring submodule 1101 is configured to perform cell measurement on an adjacent first cell in the public LTE network according to preconfigured relevant information of the first cell.

Figure 12:
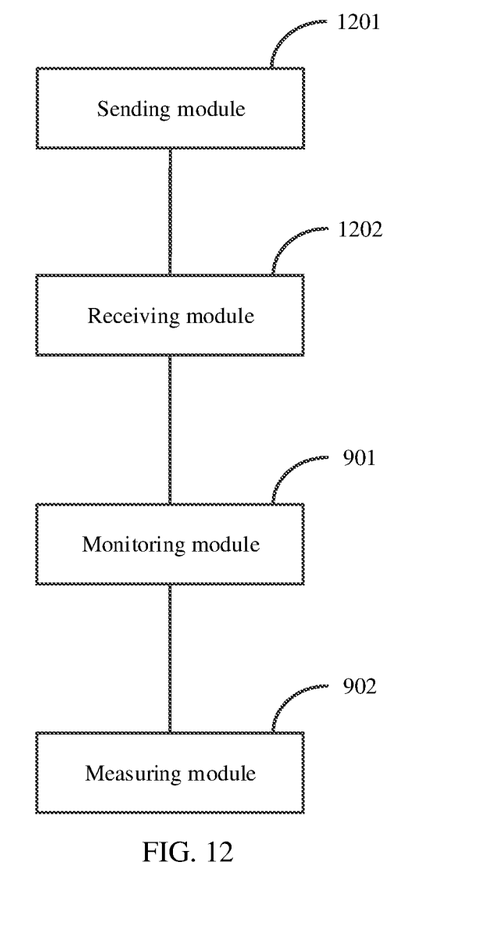
FIG. 12 is a block diagram illustrating a network measurement device according to an exemplary embodiment of the disclosure.

In an embodiment, illustrated in FIG. 12, the device further includes a sending module 1201 and a receiving module 1202.

The sending module 1201 is configured to send a random access request to a base station in the high-speed dedicated network.

The receiving module 1202 is configured to receive a radio resource control connection reconfiguration signaling fed back by the base station in the high-speed dedicated network. The radio resource control connection reconfiguration signaling carries at least one of the preset first speed threshold, the second speed threshold, or the relevant information of the adjacent first cell in the public LTE network.

The various modules can be implemented using any suitable technology. For example, a module may be implemented using circuitry, such as an integrated circuit (IC). As another example, a module may be implemented as a processing circuit executing software instructions.

With respect to the device in the above embodiments, the specific manners in which the modules perform operations have been described in detail in the method embodiments, which will not be repeated herein.

Figure 13:
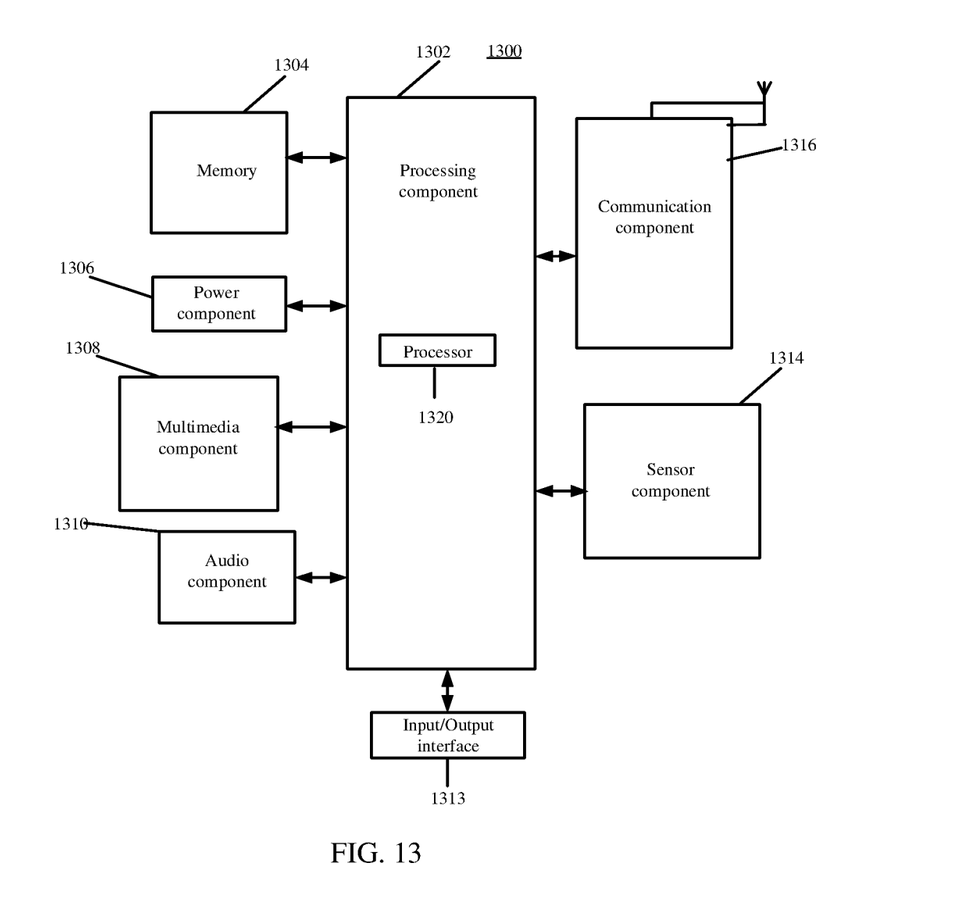
FIG. 13 is a block diagram of user equipment according to an exemplary embodiment of the disclosure.

FIG. 13 is a block diagram illustrating a device 1300 for network configuration according to an exemplary embodiment. For example, the device 1300 may be UE such as a mobile phone, a computer, a digital broadcast terminal, a messaging device, a gaming console, a tablet, a medical device, exercise equipment and a personal digital assistant and so on.

The device 1300 may include one or more of the following components: a processing component 1302, a memory 1304, a power component 1306, a multimedia component 1308, an audio component 1310, an Input/Output (I/O) interface 1313, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the operations in the abovementioned method. Moreover, the processing component 1302 may include one or more modules which facilitate interaction between the processing component 1302 and the other components. For instance, the processing component 1302 may include a multimedia module to facilitate interaction between the multimedia component 1308 and the processing component 1302.

The memory 1304 is configured to store various types of data to support the operation of the device 1300. Examples of such data include instructions for any application program or method operated on the device 1300, contact data, phonebook data, messages, pictures, video, etc. The memory 1304 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1306 provides power for various components of the device 1300. The power component 1306 may include a power management system, one or more power supplies, and other components associated with generation, management and distribution of power for the device 1300.

The multimedia component 1308 includes a screen providing an output interface between the device 1300 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1308 includes a front camera and/or a rear camera. The front camera and/or the rear camera may receive external multimedia data when the device 1300 is in an operation mode, such as a photographing mode or a video mode. Each of the front camera and the rear camera may be a fixed optical lens system or have focusing and optical zooming capability.

The audio component 1310 is configured to output and/or input audio signals. For example, the audio component 1310 includes a Microphone (MIC), and the MIC is configured to receive an external audio signal when the device 1300 is in an operation mode, such as a call mode, a recording mode and a voice recognition mode. The received audio signal may further be stored in the memory 1304 or sent through the communication component 1316. In some embodiments, the audio component 1310 further includes a speaker configured to output the audio signal.

The I/O interface 1313 provides an interface between the processing component 1302 and a peripheral interface module, and the peripheral interface module may be a keyboard, a click wheel, a button and the like. The button may include, but not limited to: a home button, a volume button, a starting button and a locking button.

The sensor component 1314 includes one or more sensors configured to provide status assessment in various aspects for the device 1300. For instance, the sensor component 1314 may detect an on/off status of the device 1300 and relative positioning of components, such as a display and small keyboard of the device 1300, and the sensor component 1314 may further detect a change in a position of the device 1300 or a component of the device 1300, presence or absence of contact between the user and the device 1300, orientation or acceleration/deceleration of the device 1300 and a change in temperature of the device 1300. The sensor component 1314 may include a proximity sensor configured to detect presence of an object nearby without any physical contact. The sensor component 1314 may also include a light sensor, such as a Complementary Metal Oxide Semiconductor (CMOS) or Charge Coupled Device (CCD) image sensor, configured for use in an imaging application. In some embodiments, the sensor component 1314 may also include an acceleration sensor, a gyroscope sensor, a magnetic sensor, a pressure sensor or a temperature sensor.

The communication component 1316 is configured to facilitate wired or wireless communication between the device 1300 and another device. The device 1300 may access a communication-standard-based wireless network, such as a Wireless Fidelity (Wi-Fi) network, a 4th-Generation (4G) or 5th-Generation (5G) network or a combination thereof. In an exemplary embodiment, the communication component 1316 receives a broadcast signal or broadcast associated information from an external broadcast management system through a broadcast channel In an exemplary embodiment, the communication component 1316 further includes a Near Field Communication (NFC) module to facilitate short-range communication. In an exemplary embodiment, the communication component 1316 may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the above described methods.

In an exemplary embodiment, there is also provided a non-transitory computer-readable storage medium including an instruction, such as the memory 1304 including an instruction, and the instruction may be executed by the processor 1320 of the device 1300 to perform the above described methods. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

In an exemplary embodiment of the disclosure, a network configuration device is provided, which includes: a processor; and a memory configured to store instructions executable by the processor. The processor is configured to: monitor a moving speed of the network configuration device; and perform cell measurement on adjacent cells in the public LTE network when the monitored moving speed is less than a preset first speed threshold.

In an exemplary embodiment, the processor is further configured to: perform no cell measurement on the adjacent cells in the public LTE network when the monitored moving speed is greater than a preset second speed threshold, the second speed threshold being not less than the first speed threshold.

In an exemplary embodiment, the processor, in performing cell measurement on the adjacent cells in the public LTE network, is further configured to perform cell measurement on an adjacent first cell in the public LTE network according to preconfigured relevant information of the first cell.

In an exemplary embodiment, the processor is further configured to obtain at least one of the first speed threshold, the second speed threshold or the relevant information of the adjacent first cell in the public LTE network through the following manner: sending a random access request to a base station in the high-speed dedicated network; and receiving a radio resource control connection reconfiguration signaling fed back by the base station in the high-speed dedicated network, the radio resource control connection reconfiguration signaling carrying at least one of the preset first speed threshold, the second speed threshold, or the relevant information of the adjacent first cell in the public LTE network.

In an exemplary embodiment of the disclosure, a non-transitory computer readable storage medium is provided. The instructions in the storage medium, when executed by a processor of the device 1300, cause the device 1300 to perform the above network configuration method. The method may include the following operations: a moving speed of the device is monitored; and cell measurement is performed on adjacent cells in the public LTE network when the monitored moving speed is less than a preset first speed threshold.

In an exemplary embodiment, no cell measurement is performed on the adjacent cells in the public LTE network when the monitored moving speed is greater than a preset second speed threshold, the second speed threshold being not less than the first speed threshold.

In an exemplary embodiment, the operation of performing cell measurement on the adjacent cells in the public LTE network includes: performing cell measurement on an adjacent first cell in the public LTE network according to preconfigured relevant information of the first cell.

In an exemplary embodiment, the method further includes obtaining at least one of the first speed threshold, the second speed threshold or the relevant information of the adjacent first cell in the public LTE network through the following manner: sending a random access request to a base station in the high-speed dedicated network; and receiving a radio resource control connection reconfiguration signaling fed back by the base station in the high-speed dedicated network, the radio resource control connection reconfiguration signaling carrying at least one of the preset first speed threshold, the second speed threshold, or the relevant information of the adjacent first cell in the public LTE network.

Figure 14:
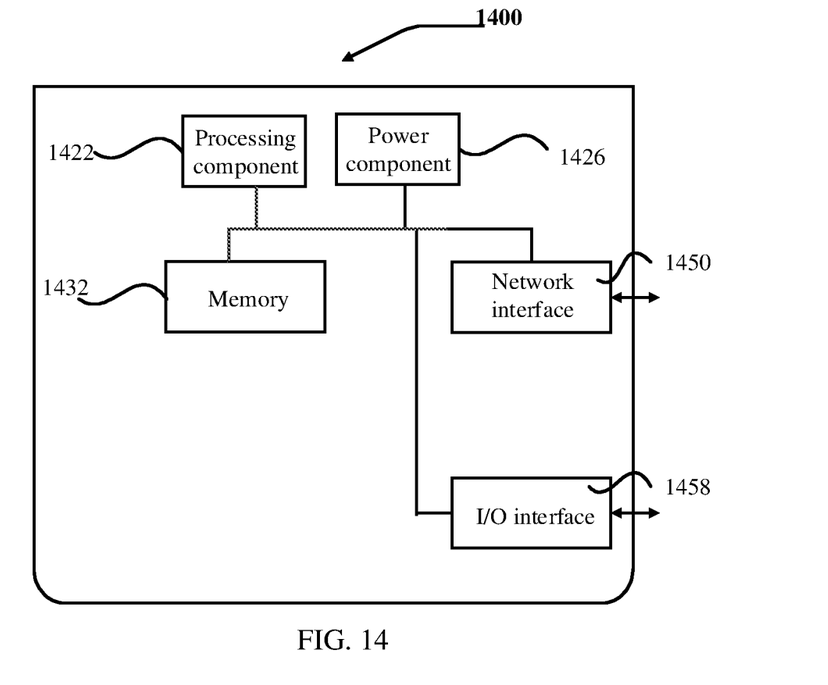
FIG. 14 is a block diagram of a base station according to an exemplary embodiment of the disclosure.

FIG. 14 is a block diagram illustrating a device 1400 for network configuration and measurement according to an exemplary embodiment. For example, the device 1400 may be provided as a base station. Referring to FIG. 14, the device 1400 includes a processing component 1422, which further includes one or more processors, and a memory resource represented by a memory 1432, which stores instructions (such as an application program) executable by the processing component 1422. The application program stored in the memory 1432 may include one or more modules, each of which corresponds to a set of instructions. Moreover, the processing component 1422 is configured to execute the instructions to perform the above methods.

The device 1400 may further include a power component 1426 configured to conduct power management of the device 1400, a wired or wireless network interface 1450 configured to connect the device 1400 to a network, and an I/O interface 1458. The device 1400 may operate based on an operation system stored in the memory 1432, such as Windows Server™, Mac OS X™, Unix™, Linux™, FreeBSD™ and the like.

In an exemplary embodiment of the disclosure, a network configuration device is provided, which includes: a processor; and a memory configured to store instructions executable by the processor. The processor is configured to: receive a random access request from UE; and send a radio resource control connection reconfiguration signaling to the UE, the radio resource control connection reconfiguration signaling carrying a preset first speed threshold configured to instruct the UE to perform cell measurement on adjacent cells in the public LTE network when the UE moves at a speed less than the first speed threshold.

In an exemplary embodiment, the processor is further configured to: include, in the radio resource control connection reconfiguration signaling, a preset second speed threshold configured to instruct the UE to perform no cell measurement on the adjacent cells in the public LTE network when the UE moves at a speed greater than the second speed threshold, the second speed threshold being not less than the first speed threshold.

In an exemplary embodiment, the processor is further configured to: include, in the radio resource control connection reconfiguration signaling, relevant information of an adjacent first cell in the public LTE network which is configured to instruct the UE to perform cell measurement on the first cell according to the relevant information when the UE moves at a speed less than the first speed threshold.

In an exemplary embodiment, the processor is further configured to obtain the relevant information of the first cell in advance through one of following manners.

In a first manner, the relevant information of the adjacent first cell in the public LTE network is configured into a base station in the high-speed-railway dedicated network, when the base station in the high-speed-railway dedicated network or a base station in the public LTE network is established initially.

In a second manner, the relevant information of the adjacent first cell in the public LTE network is obtained via an X2 communication message when an X2 interface connection to an adjacent base station in the public LTE network is established initially.

In a third manner, the relevant information of the adjacent first cell in the public LTE network is obtained by communicating with the adjacent base station in the public LTE network via the X2 communication message when the random access request is received from the UE for the first time.

In an exemplary embodiment of the disclosure, a non-transitory computer readable storage medium is provided. Instructions in the storage medium, when executed by a processor of the device 1400, cause the device 1400 to perform the above network configuration method. The method may include the following operations: a random access request is received from UE; and a radio resource control connection reconfiguration signaling is sent to the UE, the radio resource control connection reconfiguration signaling carrying a preset first speed threshold configured to instruct the UE to perform cell measurement on adjacent cells in the public LTE network when the UE moves at a speed less than the first speed threshold.

In an exemplary embodiment, the radio resource control connection reconfiguration signaling further carries a preset second speed threshold configured to instruct the UE to perform no cell measurement on the adjacent cells in the public LTE network when the UE moves at a speed greater than the second speed threshold, the second speed threshold being not less than the first speed threshold.

In an exemplary embodiment, the radio resource control connection reconfiguration signaling further carries relevant information of an adjacent first cell in the public LTE network which is configured to instruct the UE to perform cell measurement on the first cell according to the relevant information when the UE moves at a speed less than the first speed threshold.

In an exemplary embodiment, the method further includes: obtaining the relevant information of the first cell in advance through one of following manners.

In a first manner, the relevant information of the adjacent first cell in the public LTE network is configured into a base station in the high-speed-railway dedicated network, when the base station in the high-speed-railway dedicated network or the base station in the public LTE network is established initially.

In a second manner, the relevant information of the adjacent first cell in the public LTE network is obtained via the X2 communication message when an X2 interface connection to an adjacent base station in the public LTE network is established initially.

In a third manner, the relevant information of the adjacent first cell in the public LTE network is obtained by communicating with the adjacent base station in the public LTE network via the X2 communication message when the random access request is received from the UE for the first time.

Other implementations of the present disclosure will be apparent to those skilled in the art from consideration of the specification and practice of the present disclosure. The disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A network configuration method, applied to a base station in a high-speed-railway dedicated network, the method comprising:
   receiving a random access request from user equipment (UE); and
   sending a radio resource control connection reconfiguration signaling to the UE,
   wherein the radio resource control connection reconfiguration signaling carries a first speed threshold configured to instruct the UE to perform cell measurement on adjacent cells in a public Long Term Evolution (LTE) network when the UE moves at a speed less than the first speed threshold and perform handover from a cell in the high-speed-railway dedicated network to one of the adjacent cells in the public LTE network responsive to that a measurement result of the cell measurement meets a requirement for the handover, and a second speed threshold configured to instruct the UE to perform no cell measurement on the adjacent cells in the public LTE network when the UE moves at a speed greater than the second speed threshold, wherein the second speed threshold is not less than the first speed threshold;
   in response to a moving speed of the UE changing from high to low, the first speed threshold is used by the UE as a reference to determine not to perform cell measurement on adjacent cells in the public LTE network when the moving speed of the UE is not less than the first speed threshold; and
   in response to the moving speed of the UE changing from low to high, the second speed threshold is used by the UE as the reference to determine to perform cell measurement on adjacent cells in the public LTE network when the moving speed of the UE is less than the second speed threshold.

2. The method according to claim 1, wherein the radio resource control connection reconfiguration signaling further carries relevant information of an adjacent first cell in the public LTE network, wherein the relevant information of the first cell is configured to instruct the UE to perform cell measurement on the first cell according to the relevant information when the UE moves at a speed less than the first speed threshold.

3. The method according to claim 2, wherein the relevant information of the first cell is obtained in advance by at least one of:
   configuring the relevant information of the adjacent first cell in the public LTE network into the base station in the high-speed-railway dedicated network, when the base station in the high-speed-railway dedicated network or a base station in the public LTE network is established initially;
   obtaining the relevant information of the adjacent first cell in the public LTE network via an X2 communication message when an X2 interface connection to an adjacent base station in the public LTE network is established initially; or
   obtaining the relevant information of the adjacent first cell in the public LTE network by communicating with the adjacent base station in the public LTE network via the X2 communication message when the random access request is received from the UE for the first time.

4. A network measurement method, applied to user equipment (UE) connected to a cell in a high-speed-railway dedicated network, the method comprising:
   obtaining a first speed threshold and a second speed threshold by:
      sending a random access request to a base station in the high-speed-railway dedicated network; and
      receiving a radio resource control connection reconfiguration signaling fed back by the base station in the high-speed-railway dedicated network, wherein the radio resource control connection reconfiguration signaling carries the first speed threshold and the second speed threshold;
   performing cell measurement on adjacent cells in a public Long Term Evolution (LTE) network when a moving speed of the UE is less than the first speed threshold and performing handover from a cell in the high-speed-railway dedicated network to one of the adjacent cells in the public LTE network responsive to that a measurement result of the cell measurement meets a requirement for the handover;
   performing no cell measurement on the adjacent cells in the public LTE network when the moving speed of the UE is greater than the second speed threshold, wherein the second speed threshold is not less than the first speed threshold;
   in response to a moving speed of the UE changing from high to low, determining not to perform cell measurement on adjacent cells in the public LTE network using the first speed threshold as a reference when the moving speed of the UE is not less than the first speed threshold; and
   in response to the moving speed of the UE changing from low to high, determining to perform cell measurement on adjacent cells in the public LTE network using the second speed threshold as the reference when the moving speed of the UE is less than the second speed threshold.

5. The method according to claim 4, wherein performing cell measurement on the adjacent cells in the public LTE network comprises:

performing cell measurement on an adjacent first cell in the public LTE network according to preconfigured relevant information of the first cell.

6. The method according to claim 4, wherein the radio resource control connection reconfiguration signaling further carries relevant information of an adjacent first cell in the public LTE network.

7. A base station, comprising:
a processor; and
a memory configured to store instructions executable by the processor,
wherein the processor is configured to:
receive a random access request from user equipment (UE); and
send a radio resource control connection reconfiguration signaling to the UE,
wherein the radio resource control connection reconfiguration signaling carries a first speed threshold configured to instruct the UE to perform cell measurement on adjacent cells in a public Long Term Evolution (LTE) network when the UE moves at a speed less than the first speed threshold and perform handover from a cell in the high-speed-railway dedicated network to one of the adjacent cells in the public LTE network responsive to that a measurement result of the cell measurement meets a requirement for the handover, and a second speed threshold configured to instruct the UE to perform no cell measurement on the adjacent cells in the public LTE network when the UE moves at a speed greater than the second speed threshold, wherein the second speed threshold is not less than the first speed threshold;
in response to a moving speed of the UE changing from high to low, the first speed threshold is used by the UE as a reference to determine not to perform cell measurement on adjacent cells in the public LTE network when the moving speed of the UE is not less than the first speed threshold; and
in response to the moving speed of the UE changing from low to high, the second speed threshold is used by the UE as the reference to determine to perform cell measurement on adjacent cells in the public LTE network when the moving speed of the UE is less than the second speed threshold.

8. The base station according to claim 7, wherein the radio resource control connection reconfiguration signaling further carries relevant information of an adjacent first cell in the public LTE network, wherein the relevant information of the first cell is configured to instruct the UE to perform cell measurement on the first cell according to the relevant information when the UE moves at a speed less than the first speed threshold.

9. The base station according to claim 8, wherein the processor is further configured to perform at least one of:
configuring the relevant information of the adjacent first cell in the public LTE network into the base station in the high-speed-railway dedicated network, when the base station in the high-speed-railway dedicated network or a base station in the public LTE network is established initially;
obtaining the relevant information of the adjacent first cell in the public LTE network via an X2 communication message when an X2 interface connection to an adjacent base station in the public LTE network is established initially; or
obtaining the relevant information of the adjacent first cell in the public LTE network by communicating with the adjacent base station in the public LTE network via the X2 communication message when the random access request is received from the UE for the first time.

10. User equipment (UE), comprising:
a processor; and
a memory configured to store instructions executable by the processor,
wherein the processor is configured to:
obtain a first speed threshold and a second speed threshold by:
sending a random access request to a base station in a high-speed-railway dedicated network; and
receiving a radio resource control connection reconfiguration signaling fed back by the base station in the high-speed-railway dedicated network, wherein the radio resource control connection reconfiguration signaling carries the first speed threshold and the second speed threshold;
perform cell measurement on adjacent cells in a public Long Term Evolution (LTE) network when a moving speed of the UE is less than the first speed threshold and perform handover from a cell in the high-speed-railway dedicated network to one of the adjacent cells in the public LTE network responsive to that a measurement result of the cell measurement meets a requirement for the handover;
perform no cell measurement on the adjacent cells in the public LTE network when the moving speed of the UE is greater than the second speed threshold, wherein the second speed threshold is not less than the first speed threshold;
in response to a moving speed of the UE changing from high to low, determine not to perform cell measurement on adjacent cells in the public LTE network using the first speed threshold as a reference when the moving speed of the UE is not less than the first speed threshold; and
in response to the moving speed of the UE changing from low to high, determine to perform cell measurement on adjacent cells in the public LTE network using the second speed threshold as the reference when the moving speed of the UE is less than the second speed threshold.

11. The UE according to claim 10, wherein the processor is further configured to:
perform cell measurement on an adjacent first cell in the public LTE network according to preconfigured relevant information of the first cell.

12. The UE according to claim 10,
wherein the radio resource control connection reconfiguration signaling further carries relevant information of an adjacent first cell in the public LTE network.

* * * * *